United States Patent [19]

Reinhold

[11] Patent Number: 5,013,234
[45] Date of Patent: May 7, 1991

[54] OFF-DRAWING APPARATUS FOR TUBULAR WEBS OF PLASTIC FILM

[76] Inventor: Klaus Reinhold, Krönerstrasse 3, 4540 Lengerich (Wesf.), Fed. Rep. of Germany

[21] Appl. No.: 552,730
[22] Filed: Jul. 16, 1990

[30] Foreign Application Priority Data

Jul. 19, 1989 [DE] Fed. Rep. of Germany ... 8908769[U]

[51] Int. Cl.⁵ .............................................. B29C 53/20
[52] U.S. Cl. .................... 425/327; 425/392; 425/397
[58] Field of Search ................. 425/72.1, 326.1, 387.1, 425/327, 328, 392, 397; 264/209.2, 209.3, 211.12, 563, 565

[56] References Cited

U.S. PATENT DOCUMENTS

| 4,634,358 | 1/1987 | Dellbrugge | 425/392 X |
| 4,643,656 | 2/1987 | Karl | 425/327 X |
| 4,650,406 | 3/1987 | Peters | 264/563 X |
| 4,760,627 | 8/1988 | Schele | 264/209.2 X |
| 4,836,744 | 6/1989 | Karl et al. | 425/72.1 |

FOREIGN PATENT DOCUMENTS 2035584 3/1972 Fed. Rep. of Germany .

Primary Examiner—Richard L. Chiesa
Attorney, Agent, or Firm—Jordan and Hamburg

[57] ABSTRACT

An off-drawing apparatus for tubular webs of plastic film produced by an extruder with a fixedly disposed blow head includes a lay-flat apparatus for the tubular web delivered with an expanded round cross section, and a stationary conveyor for carrying off the flattened tubular web to a likewise stationary winding apparatus. Between the lay-flat apparatus and the conveyor there is disposed at least one pulley roll and one overturning bar for turning the tubular web 180° with simultaneous change of direction, which, like the lay-flat apparatus, are supported in an apparatus frame for pivoting reversingly in a horizontal plane about the axis of the delivered tubular web. The lay-flat apparatus, the pulley roll and the overturning bar are held for their reversing pivoting movement on swivel rings disposed one over the other and supported directly on one another through interposed rolling bodies which form together a swivel ring stack rotatably mounted in the apparatus frame and compressively stressed, whose inside diameter is at least equal to the maximum working width of the apparatus.

29 Claims, 10 Drawing Sheets

OFF-DRAWING APPARATUS FOR TUBULAR WEBS OF PLASTIC FILM

BACKGROUND OF THE INVENTION

The invention relates to an off-drawing apparatus for tubular webs of plastic film made by an extruder with a fixedly disposed blow head.

In the production of tubular webs of plastic film by the blowing method variations in thickness are unavoidable. They are due, for example, to the usual production tolerances in the blow head of the extruder used in making the film, in the gauging system through which the tubular web of expanded, round cross section passes after extrusion, or due to the internal and external cooling or to other external circumstances. Unless appropriate measures are taken, when such tubular film webs are wound in the flattened state in a winding apparatus, raised rings would be produced on the roll of film due to the addition of the irregularities in thickness, and these would result in a permanent deformation of the film in those areas and would interfere with the printing and further processing of the tubular film.

As an appropriate countermeasure for preventing the formation of raised rings on the film roll, so-called reversing off-drawing apparatus have been developed for the tubular web, in which the reversing movement of the parts of the apparatus that are involved produces a periodical migration of the creases formed when the tubular web is flattened. This results in a corresponding distribution of any thickness irregularities over the width of the flattened tubular web. In the winding of the flattened tubular web that then takes place in a winding apparatus, the formation of raised rings on the roll is prevented by the addition of thickness irregularities of the film. Obviously, the angle of the reversing movement must be made sufficiently great.

In a known generic apparatus (German Fed. Pat. No. 20 35 584) the lay-flat apparatus with its pinch rollers is swiveled reversingly over approximately 360° about the axis of the delivered tubular web, and it has been found that this swivel angle is proportional to a reversing movement for the majority of applications of a reversing off-drawing apparatus, while in addition to the two pulley rolls for turning the web by about 180°, two overturning bars are provided in tandem for turning the web about 180° with simultaneous change of direction, successively and alternately with one another. On the other hand, in applications in which the swivel angle of the reversing movement of the lay-flat apparatus with its pinch rolls amounts to less than 360°, a single overturning bar between the two pulley rolls will suffice for the handling of the tubular web in the reversing part of the off-drawing apparatus.

In the known off-drawing apparatus constituting the genus, the supporting of the pulley rolls and overturning bars in the apparatus for swiveling is performed such that the axes of the pulley rolls and overturning bars are tangential to circles about the axis of rotation of the lay-flat apparatus, the pulley rolls being situated in every possible working position, radially outside of the parts of the overturning bars around which the tubular web passes. The swivel angles of the pulley rolls and overturning bars decrease with increasing distance from the lay-flat apparatus, and the tube of film is guided between the pulley rolls and overturning bars as well as the stationary conveyor means for carrying away the flattened tubular web in horizontal planes parallel to one another. In this manner a low structural height of the reversing system is achieved, and also, by making the radius of the circle described by the swiveling path of the axes of the overturning bars amount to the magnitude of $\pi/4 \times$ overturning bar diameter, any lateral skewing of the tubular plastic film web during the swiveling of the reversing system is counteracted. At the same time it is found that the intersection of the center axes of the tubular web strands running to and from the overturning bar lies in the central swiveling axis of the reversing system. During the reversing swiveling movement this assures that the tubular web strands will open and close in a scissor-like manner around the swivel axis, so that, theoretically, the idea is that equal friction forces opposed to one another will act symmetrically on both tubular web strands and thus axial shifting of the tubular web on the overturning bars during the reversing operation, due to unilaterally acting friction forces, will be prevented.

In the known off-drawing apparatus the lay-flat apparatus, the pulley rolls and the overturning bars are all supported on a relatively thin central shaft for performing their reversing swiveling movements, and this shaft runs in the vertical prolongation of the axis of the tubular web and is journaled in the frame of the apparatus. The entire weight of the reversing system is thus carried by the central shaft, with the result that the reversing system is very much liable to fluctuations and oscillation, which are created very rapidly, especially in the case of an off-drawing apparatus set at a high level due to a long vertical off-drawing length, when for example an operator walks on the catwalk of the off-drawing apparatus. Furthermore, the installation and maintenance of the known reversing system, and especially also the introduction of the tubular web into the off-drawing apparatus at the beginning of an extrusion is time-consuming and difficult on account of the shaft located in the center of the apparatus in prolongation of the axis of the tubular web, since this central area is difficult to reach and is occupied in part by the tubular web being carried through the apparatus.

It is therefore the aim of the invention to create an off-drawing apparatus of the generic type, while retaining the motion of the reversing system and the same controlled guidance of the tubular web from a stationary tubular film blow head through the reversing off-drawing apparatus to a stationary winding apparatus, in which the reversing system will have an improved stability avoiding unwanted fluctuations and oscillation, while at the same time facilitating the installation and maintenance of the system as well as the introduction of the tubular web.

This aim is achieved according to the invention by providing a configuration in which reversingly swiveling parts of the apparatus are supported on swivel rings whose inside diameter is at least equal to the maximum working width of the apparatus, which corresponds to the greatest possible width of the flattened tubular web that can be handled in the apparatus, i.e., the inside diameter of the swivel rings is approximately equal to the length of the pulley rolls. On the basis of these dimensional conditions, the stack of swivel rings formed by the individual rings constitutes a stable structure in which the swivel rings are supported on one another only through the interposed rolling bearings and, in regard to the bearing force, make the swivel ring stack serve as an axial bearing. This configuration virtually excludes any undesired fluctuations or oscillation when a person is walking on a catwalk or access bridge mounted on the frame of the apparatus. On account of its large inside diameter, which is equal in all of the swivel rings, the central area of the reversing system of the off-drawing apparatus, in which the vertically rising tubular web runs into the system, is kept free of any parts of apparatus which might make installation and maintenance difficult or interfere with or complicate the introduction of the tubular web at the beginning of an extrusion.

Numerous additional features and advantages of the invention will be found in the subordinate claims and in the description that follows, in conjunction with the drawing in which an embodiment of the subject matter of the invention is represented diagrammatically.

DESCRIPTION OF THE PREFERRED EMBODIMENT

Figure 1:
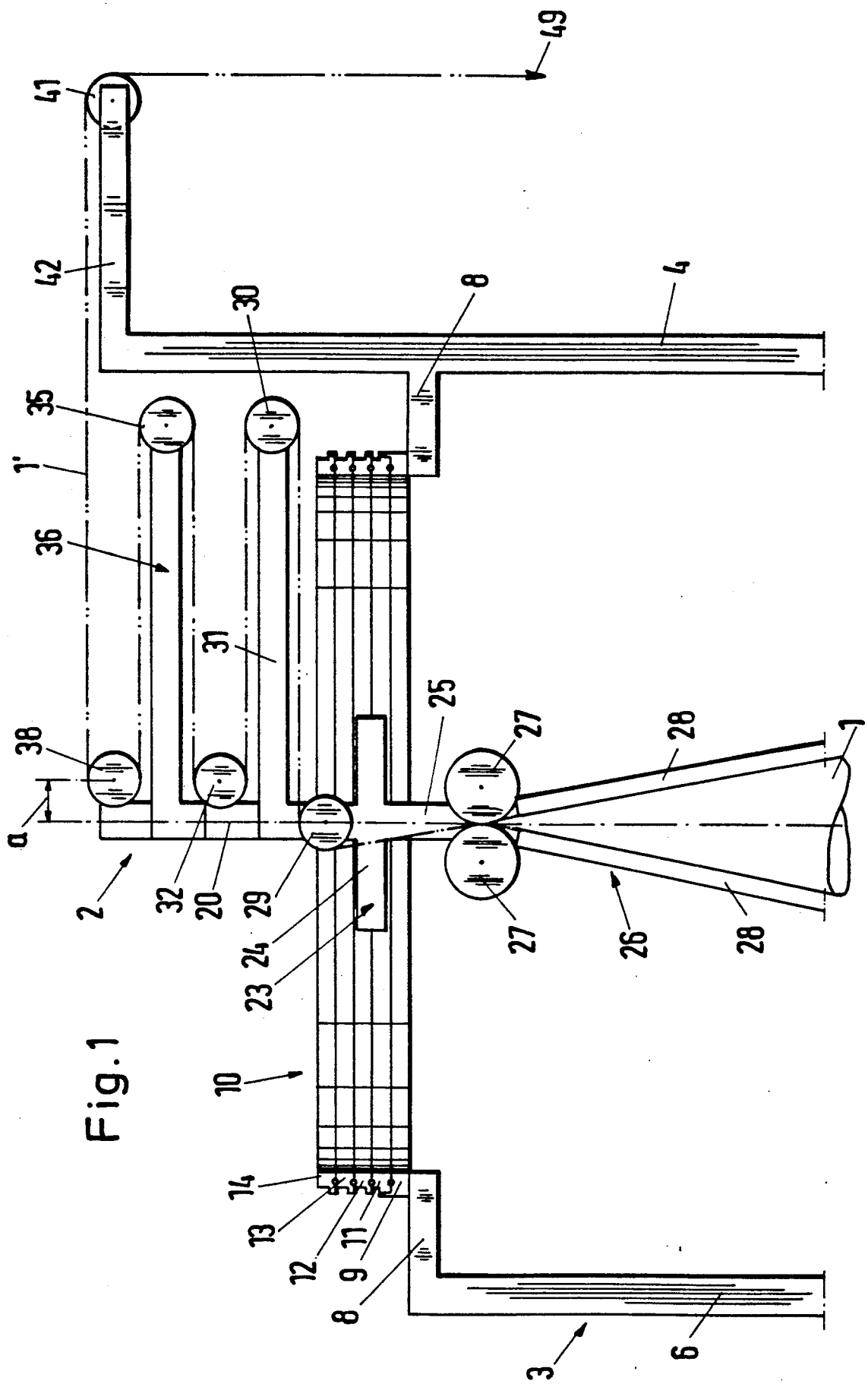
FIG. 1 is an elevation, partially in section, of a reversing off-drawing apparatus for tubular webs of plastic film, as seen in the direction of arrow I of FIG. 4.

A tubular web 1 of plastic film is fed from an extruder with a fixedly disposed film blowing head (not shown) with an expanded round or circular cross section to an off-drawing apparatus identified as a whole by 2, by which the expanded tubular web 1 is drawn off and flattened out and delivered to a winder (not shown) in which the flattened tubular web is wound into a roll. The tubular web 1 is fed upward vertically from the blow head of the extruder over a relatively long distance as necessary for the cooling and solidification of the plastic film, to the off-drawing apparatus 2 which accordingly is usually disposed in the loft area of a corresponding production shed.

For this purpose the off-drawing apparatus 2 comprises an apparatus frame 3 which is supported on the shed floor on four vertical posts 4, 5, 6 and 7. The posts 4 to 7 bear an upper horizontal support part 8 atop whose inside ends facing the tubular web 1 there is mounted a holding frame 9 for holding a swivel ring stack 10. The swivel ring stack 10 is composed of individual swivel rings 11, 12, 13 and 14 which all have the same inside and outside diameters, and their inside diameter is moreover in line with the inside diameter of the holding frame 9.

Figure 3:
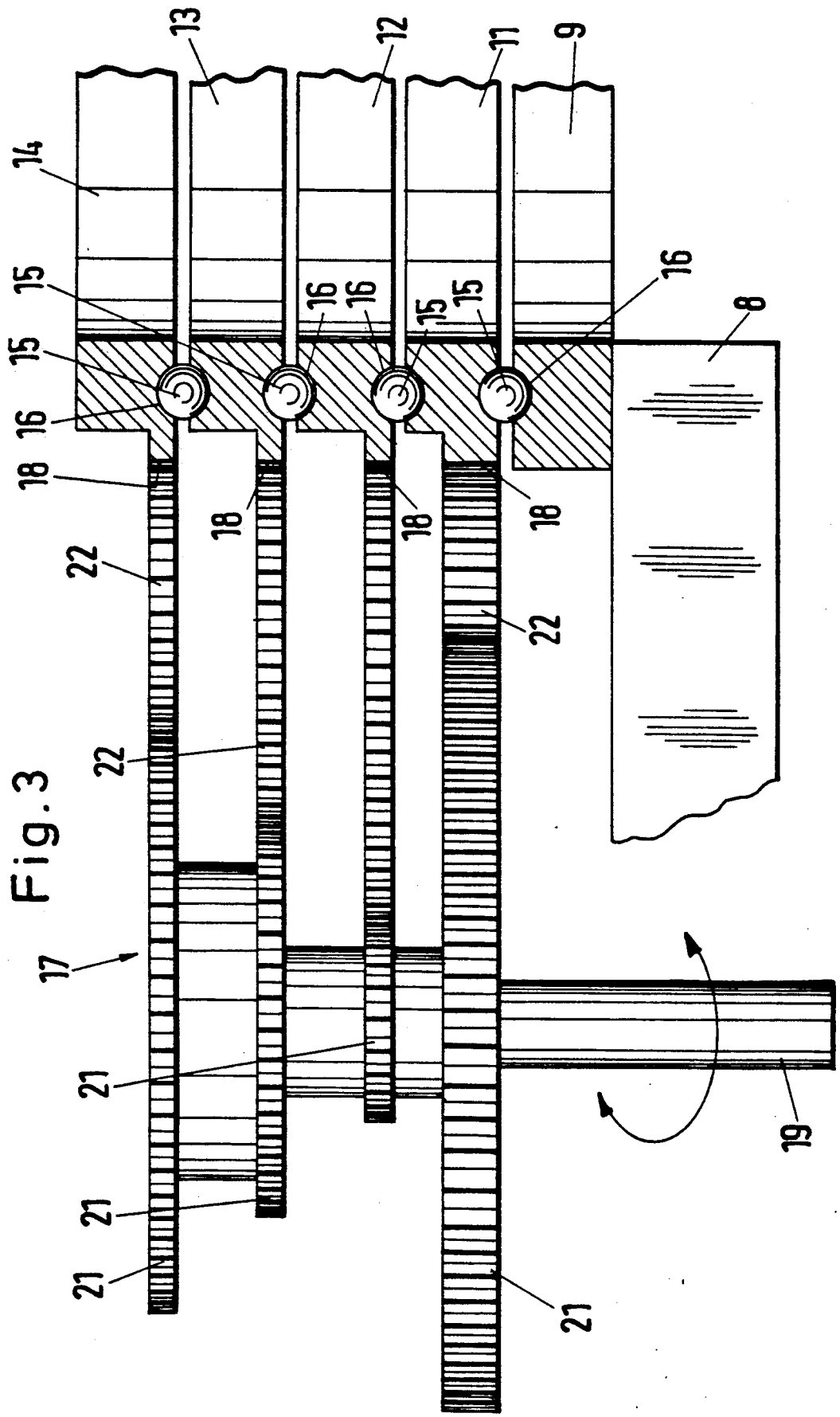
FIG. 3 is an enlarged elevation, partially in section, of a detail of a drive that is used in the reversing off-drawing apparatus.

The swivel rings 11, 12, 13 and 14 are supported directly one on the other and on the holding frame 9 by interposed rolling bearings, in this case ball bearings, and thus form a compressively stressed axial bearing. The swivel rings 11 to 14 rest freely rotatably one on the other and can be turned in any desired manner on one another. The rolling bearings or balls 15 are closely guided in ball races 16 which are machined into the confronting faces of the swivel rings 11 to 14 and of the holding frame 9, so that undesired transverse movements of the individual swivel rings in the swivel ring stack 10 in horizontal planes are virtually impossible. Driving the swivel rings 11 to 14 at different speeds can be performed by a separate motor associated with each swivel ring or by a reversing drive 17 as represented in FIG. 3. For this purpose the swivel rings 11 to 14 are provided on their outer circumference each with a driving means 18 in the form, in the example shown, of external teeth formed on the outer circumference of the swivel rings to enable them to be driven by the reversing drive 17, which is fastened laterally outside of the swivel ring stack on the frame 3 of the apparatus, in a manner not further represented. The reversing drive 17 has a drive shaft 19 which is reversibly driven by a suitable motor (not shown), and which is aligned parallel to the vertical axis 20 of the swivel ring stack 10. Drive wheels 21—gears in the example represented—are fixedly held on the drive shaft 19 at vertical intervals one over the other, and they are held in driving engagement with the driving means or external teeth 18 of each corresponding swivel ring 11 to 14 through intermediate gears 22. By the appropriate selection of the diameters of the drive wheels 21, the individual swivel rings 11 to 14 are given the correct gear ratio for their designed rotatory speed by the intermediate gears 22, which assure that the drive shaft 19 and the axis 20 of the swivel ring stack 10 will be at the same distance apart in each plane of drive transmission.

Inside of the circumference of the bottom swivel ring 11 there is fastened a holding frame 23 which comprises two circumferential parts 24 diametrically opposite one another, each with a vertical shaft 25. On the opposite shafts 25 there is provided a lay-flat apparatus 26 with two pinch rolls 27 rotatable on horizontal axes, and two lay-flat plates 28 converging toward the pinch rolls. The lay-flat apparatus 26 is installed on the part of the vertical shaft 25 that extends downward from the swivel ring stack 10. In the upper part of the vertical shaft 25 extending upwardly from the swivel ring stack 10, a guide roll 29 is mounted for free rotation within the cylindrical inside circumference of the swivel ring, and is disposed substantially vertically above the roll gap defined by the pinch rolls 27 at such a height that the tubular web 1' runs to a first, bottom pulley roll 30 without touching the upper edge of the topmost swivel ring 14. Preferably its upper culminating generatrix is situated above the horizontal plane which is assumed by the top of the uppermost swivel ring 14 and simultaneously directly adjoins the horizontal plane which is assumed by the bottom culminating generatrix of the first, bottom pulley roll 30. The pulley roll 30 is mounted for rotation at the free ends of supporting arms 31 which extend from the upper end portion of the particular vertical shank 25 of the holding frame 23. The swivel ring 11 is driven by the reversing drive 17 at a rotatory speed which corresponds to a reversing swiveling motion of 360°, i.e., plus or minus 180° from a middle position in the lay-flat apparatus 26. The reversal of the reversing drive 17 at the end of each part of the swiveling motion of the swivel ring 11 can be produced by appropriate limit switches. The same reversing swiveling motion of 360° is performed accordingly by the parts of the reversing system that are held by the swivel ring 11, i.e., the lay-flat apparatus 26 with its pinch rolls 27 and the lay-flat plates 28 as well as the guiding roll 29 and the pulley roll 30.

The pulley roll 30 is followed, in the direction of movement of the tubular web 1 or 1', inside of the reversing system, by a first overturning bar 32, which can be configured in a known manner as a so-called air overturning bar which is provided with a row of air jets for steering the tubular web. The overturning bar 32 is mounted nonrotationally on holding bars 33 which are fastened at diametrically opposite points on the outer circumference of the top swivel ring 14 and hold the overturning bar 32 nonrotationally between their outer ends 34. The reversing drive 17 gives the swivel ring 14 a rotatory speed for a turning angle of 270° as the swiveling angle of its overturning bar 32. A second, upper pulley roll 35 is fastened by holding bars 36 at the outer circumference of the swivel ring 13. The holding bars 36 are in turn fastened at diametrically opposite points to the outer circumference of the swivel ring 13, and the pulley roll 35 is mounted so as to rotate freely between its outwardly extending opposite ends 37. The reversing drive 17 gives the swivel ring 13 a rotatory speed for a reversing swing angle of its pulley roll 35 about the vertical axis 20 of the swivel ring stack 10 of 180°.

An overturning bar 38 following the pulley roll 35, which like the overturning bar 32 can be configured as an air overturning bar, is supported by holding bars 39 fastened diametrically opposite one another to the outer circumference of the swivel ring 12, being affixed at its extremities between the outer ends 40 of the holding bars 39. The reversing drive gives the swivel ring 12 a rotatory speed for a reversing swiveling motion of the overturning bar 38 of 90°.

In substantially the same horizontal plane as the upper overturning bar 38, a pulley roll 41 is supported for free rotation on the machine frame 3, as a fixed conveyor for carrying away the flattened tubular web 1. For this purposes the vertical posts 4 and 5 of the apparatus frame 1 are provided with horizontal upper supporting arms 42 between whose free ends the pulley roll 41 is rotatably mounted.

The pulley rolls 30 and 35 as well as the overturning bars 32 and 38 are held by their holding bars 31, 33, 36 and 39 in an area above and outside of the swivel ring stack 10. The outer end portions 31a, 34, 37 and 40 of the holding bars 31, 33, 36 and 39 of the pulley rolls and overturning bars or the pulley rolls 30, 35, and the overturning bars 32, 38, themselves, in their reversing swinging movement on the axis 20 of the swivel ring stack 10 at different rotatory speeds corresponding to the swiveling angles diminishing with increasing distance from the pinch rolls 27, define interference or limit circles of different radius. At the same time the interference circle described by the swivel ring 11 with its pulley roll 30 is the smallest and is surrounded by the interference circle of swivel ring 14 with the overturning bar 32. The next larger interference circle is that of swivel ring 13 with the pulley roll 35, and the interference circle of swivel ring 12 with the upper overturning bar 38 is the greatest interference circle, which surrounds all the other interference circles. In the reversed operation of the off-drawing apparatus, this assures a mutually interference-free swinging movement of the pulley rolls 30 and 35 and of the overturning bars 32 and 38, with consideration of their different swing angles or different rotatory speeds.

Figure 2:
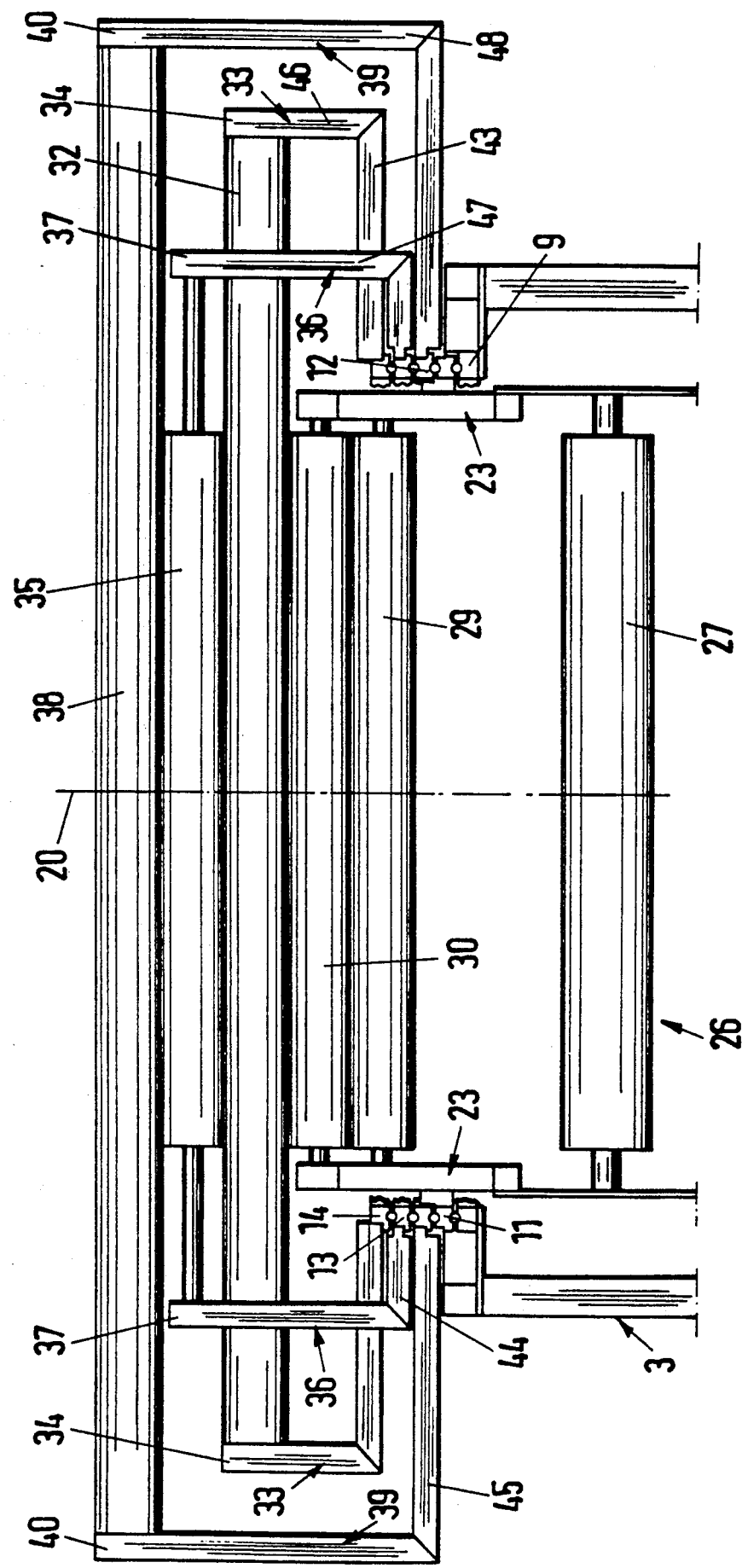
FIG. 2 is an elevation, partially in section, of the reversing off-drawing apparatus as seen in the direction of arrow II of FIG. 4.

For the constitution of these limit or interference circles of different radius, the outside bars 33, 36 and 39 of the interference circles carried around the pulley roll 30 mounted inside on the bottom swivel ring 11 with single straight holding bars 31 are provided with horizontal bar portions 43 and 44 and 45, in order to shift the corresponding interference circles correspondingly far outwardly, as can be seen especially in FIG. 2. Furthermore, FIG. 2 shows especially clearly that the pulley roll 30, the overturning bar 32, the pulley roll 35 and the overturning bar 38 are disposed in different horizontal planes one over the other such that each of their facing generatrices lie in a common horizontal plane. To achieve this, the bars 33, 36 and 39 of the swivel rings 14, 13 and 12 comprise vertical bar parts 46, 47 and 48 of appropriate height, as shown in FIG. 2.

The roll gap defined by the two pinch rolls 27 of the lay-flat apparatus 26, as this can be seen especially in FIG. 1, is disposed at the center of the axis of rotation 20 of the swivel ring stack 10, which in turn is disposed in prolongation of the central axis 47 of the tubular web 1 running to the pinch rolls 27. Usually, one of the two pinch rolls 27 is mounted fixedly, while the other is held so as to be able to be lowered on the supporting shafts 25. This lowering is necessary in order to pull the tubular web 1 in at the beginning of the extrusion process. By means of the hydraulic cylinders, springs and other such pressing means used for this purpose, the contact pressure of the pinch rolls 27 against one another can be set, and thus the pressure applied to the tubular web 1 which is advanced through the roll gap and thus laid flat. The fixedly mounted pinch roll 27 can be driven by a controlled-speed motor (not shown).

The overturning bars 32 and 38 have a base position at a distance a from the axis of rotation 20 of the swivel ring stack 10. This distance a corresponds to the radius of a circle around the axis of rotation 20 described by the swiveling of the axes of the overturning bars 32 and 38 in the reversing operation, and is calculated by the formula: overturning bar diameter $\times \pi/4$. Lowering the overturning bars 32 and 38 to pull in the tubular web 1 at the start of the extrusion process is not necessary in this configuration, since unlimited freedom of operation is given above the swivel ring stack 10. It is obvious, anyway, that the overturning bars 32 and 38 must be long enough to accommodate the tubular web 1, while their maximum inclination, 45° in the example represented, also determines the arrangement of the pulley rolls 30 and 35, as is well known to the practitioner of the art.

In the operation of the off-drawing apparatus, the tubular web 1' laid flat between the pinch rolls 27 is carried through the apparatus 2 as indicated by the broken lines in FIG. 1 as well as in FIGS. 4 to 10. The flattened tubular web 1' is first fed substantially in the vertical direction to the guide roll 29 lying with its axis in the axis of rotation 20 of the of the swivel ring stack 10, to be carried with a slight wrap-around beyond it to the pulley roll 30. Basically it would also be possible to carry the laid-flat tubular web 1' from the pinch roll pair 27 directly to the pulley roll 30, but this would result in an otherwise unnecessary and hence uneconomical increase in the diameter of the swivel ring stack 10 to accommodate the tubular web 1'. Passing around the pulley roll 30, the tubular web 1' is delivered to the overturning bar 32, passes around the latter, and is delivered over its upper side to the bottom side of the pulley roll 35, around which it passes again, to be delivered from upper side of the latter to the bottom side of the upper overturning bar 38. The tubular web 1' runs around the inner side of the overturning bar 38 and is fed from the upper side thereof to the fixed pulley roll 41 in the same plane, from which it is fed vertically downward as indicated by arrow 49 in FIG. 1 to a stationary winding apparatus. The tubular web 1' is carried between the pulley rolls 30 and 35 and the overturning bars 32 and 38 alternately inwardly and outwardly, to the axis of rotation 20 of the swivel ring stack 10, while at the same time the reversingly swung parts of the off-drawing devices uniformly distribute over the tubular web the variations in thickness of the plastic film, in accordance with the known principle of reversing off-drawing apparatus.

Figure 4:
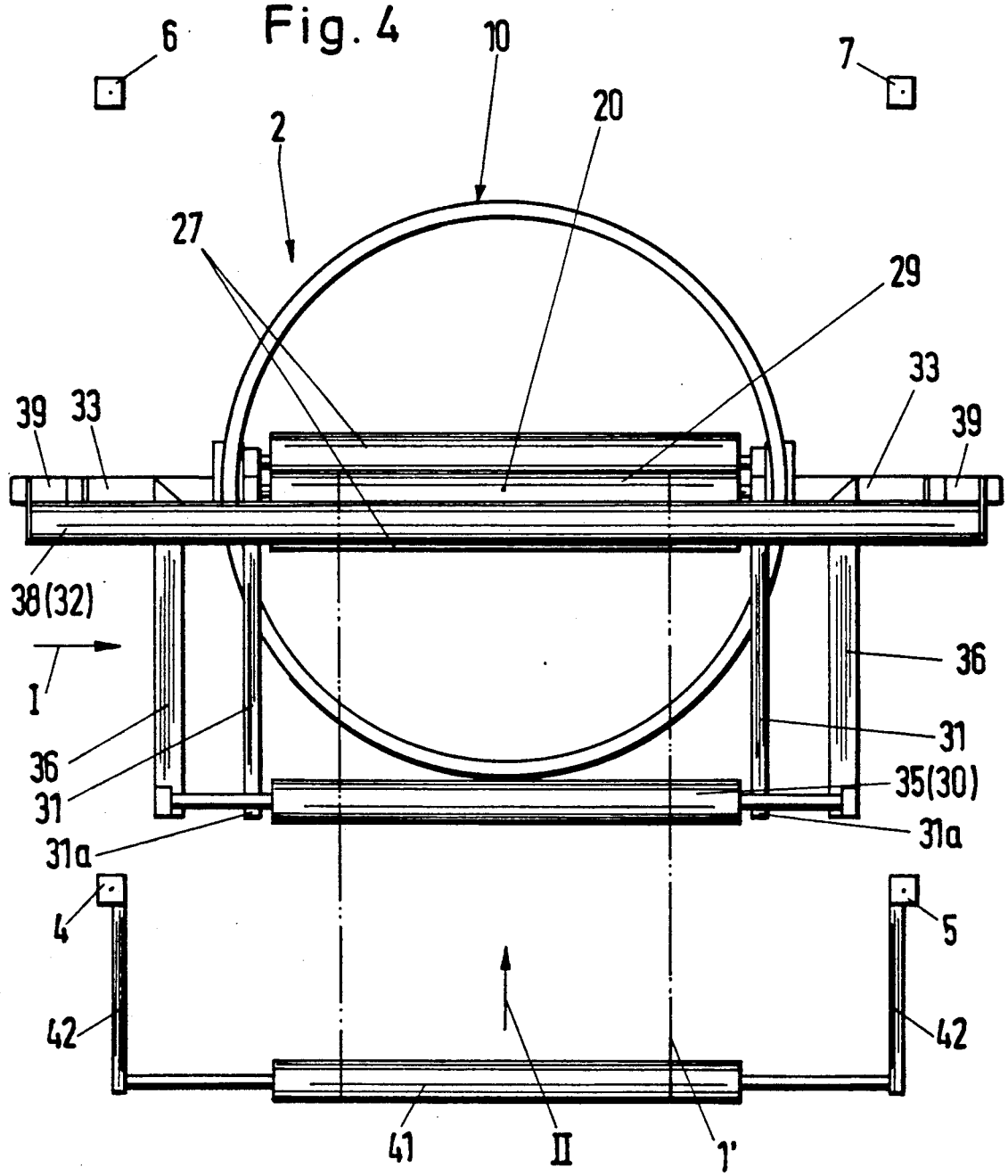
FIG. 4 is a plan view of the off-drawing apparatus of FIGS. 1 to 3 at the middle of the reverse course of the flattening apparatus.
Figure 5:
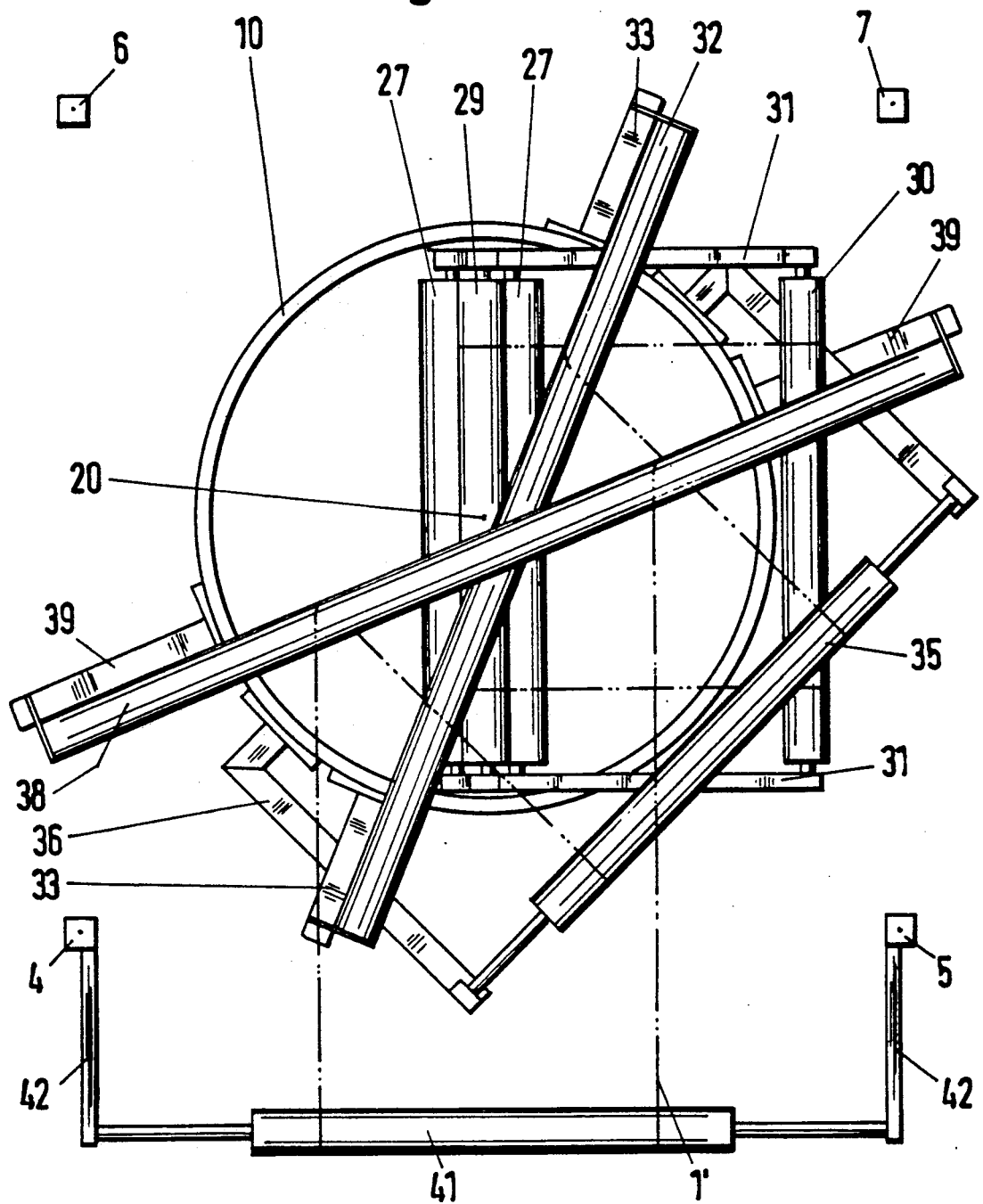
FIGS. 5 to 8 are views corresponding to FIG. 4 to show various working positions of the reversing parts of the off-drawing apparatus in each case after the flattening apparatus is turned by +90° and +180°, and −90° and −180°, starting from the mid-position represented in FIG. 4, and FIGS. 9 and 10 are each a simplified representation of a modified embodiment of the reversing off-drawing apparatus with an adjustable overturning bar.
Figure 6:
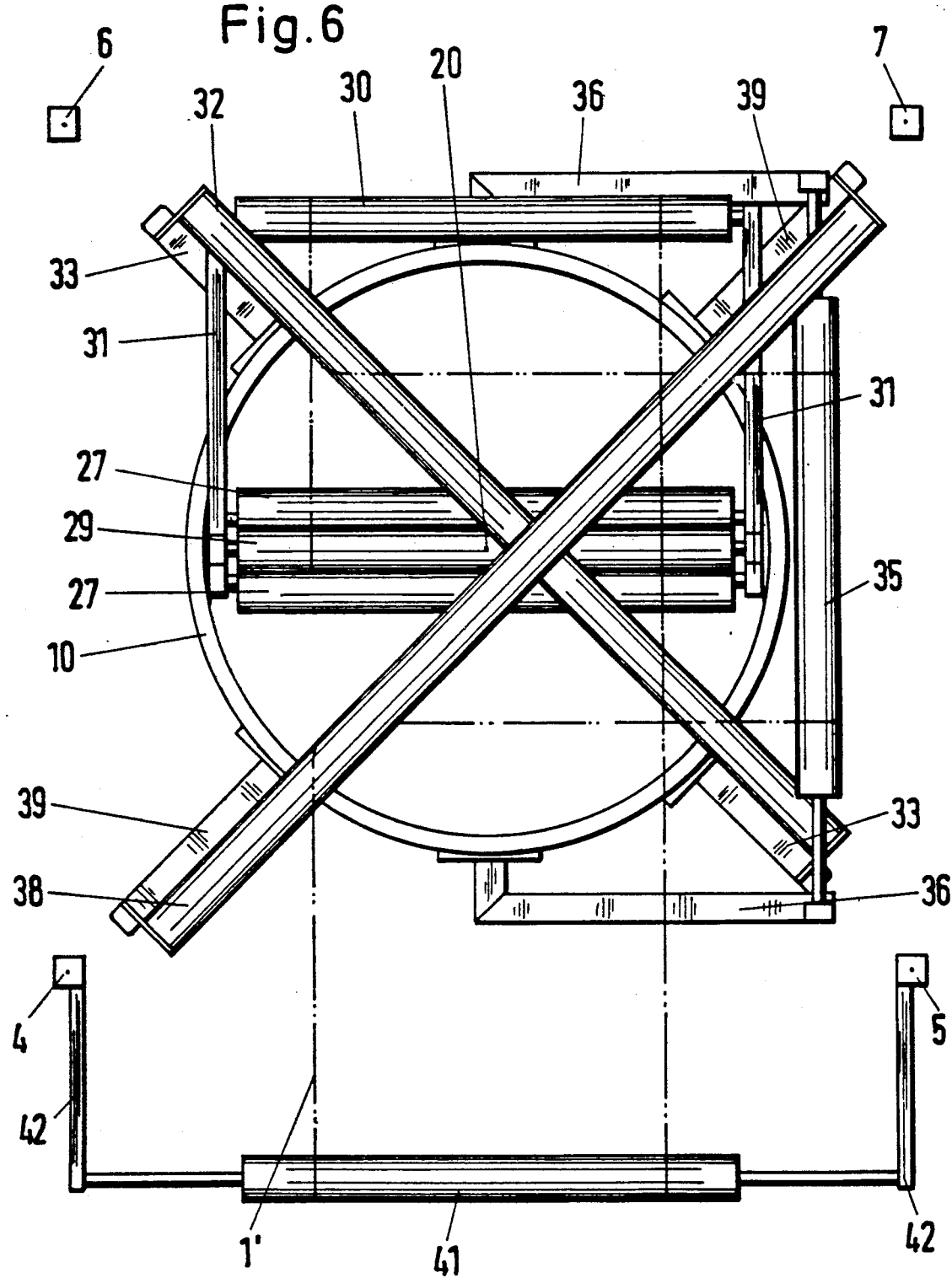
Figure 7:
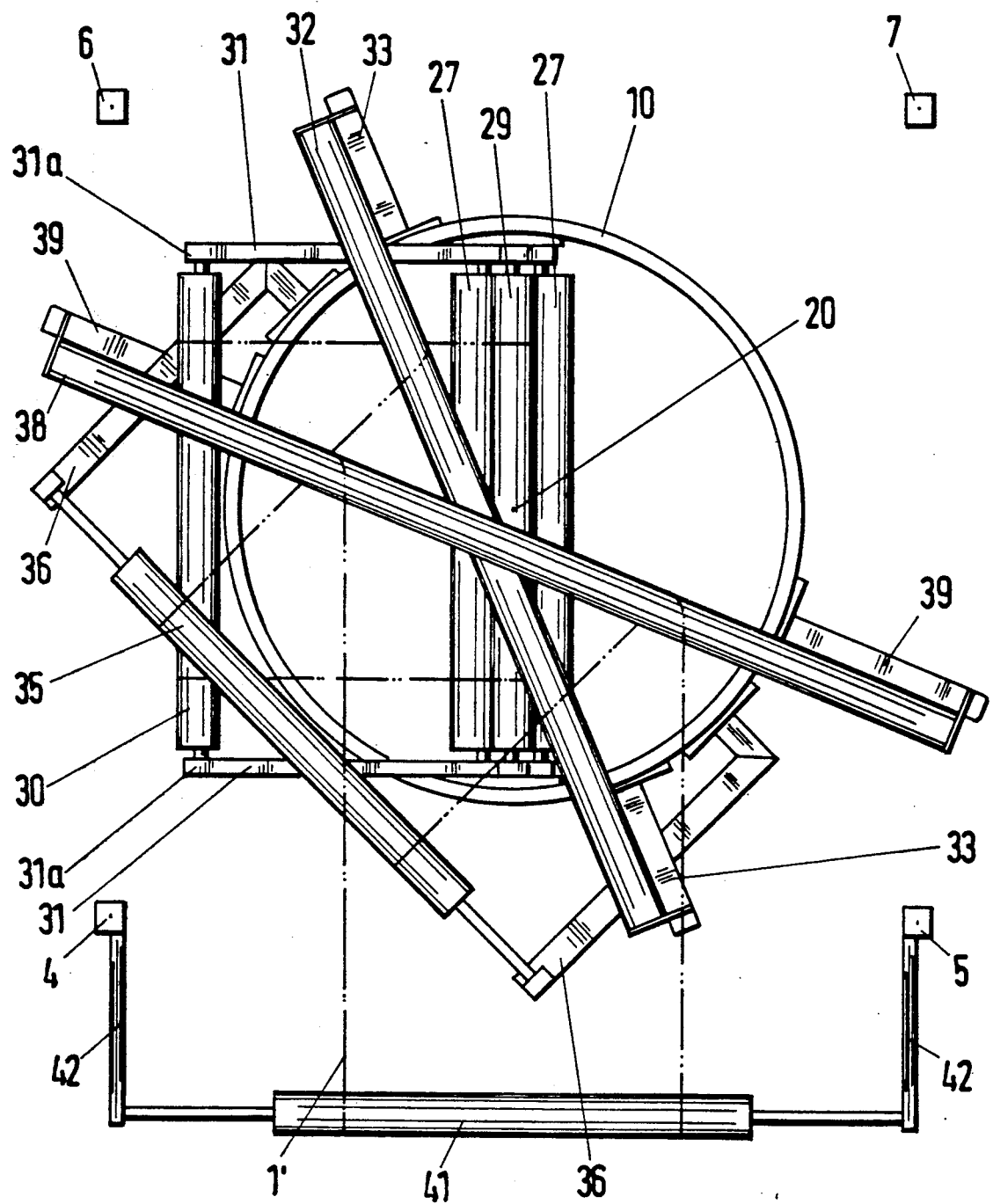
Figure 8:
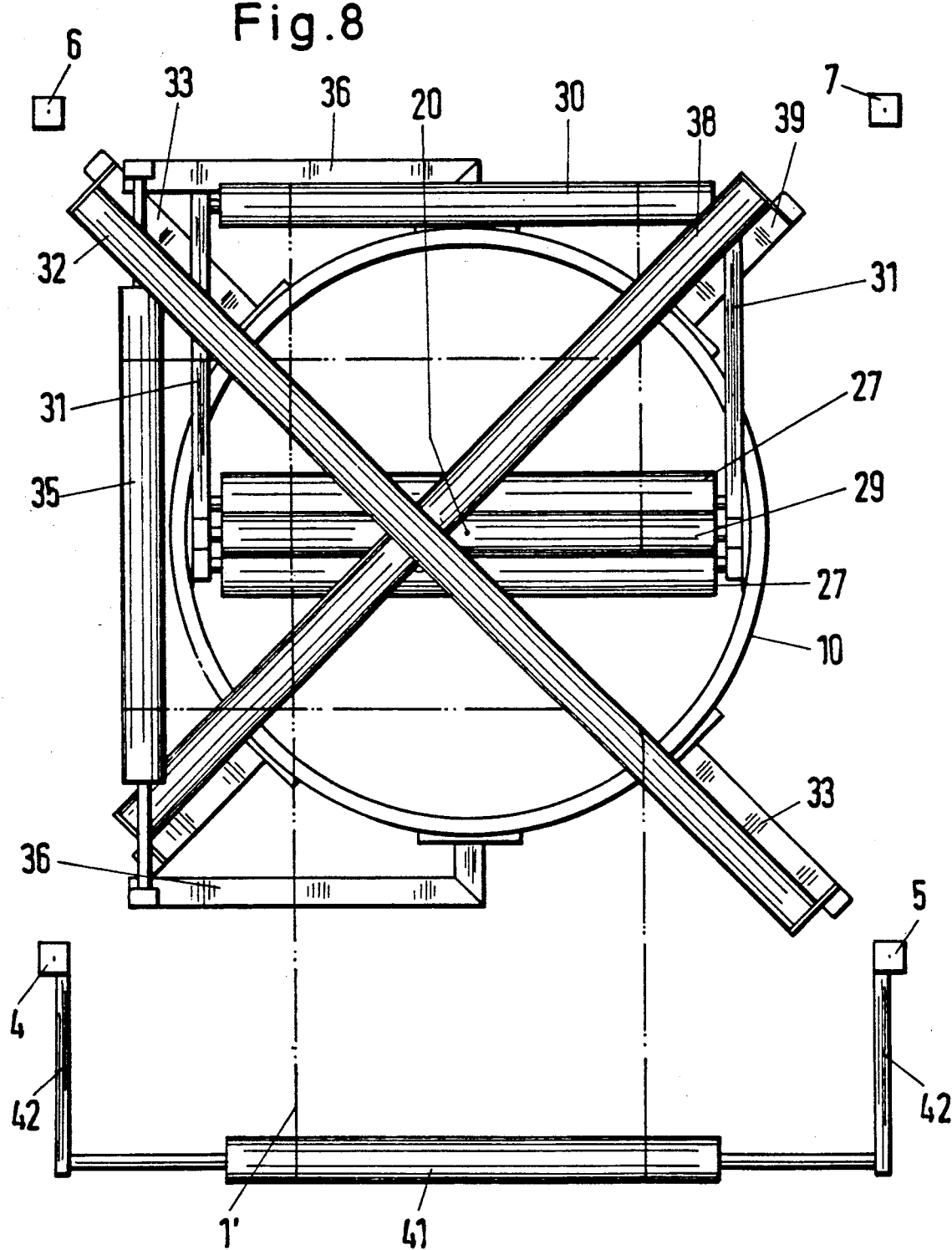

FIG. 4 shows a middle position of the lay-flat apparatus 26 with its pinch rolls 27, and it can be seen that in this position the pulley rolls 30 and 35 on the one hand and the overturning bars 32 and 38 are in line with one another in the direction of the axis of rotation 20 of the swivel ring stack 10. FIGS. 5 and 6 as well as 7 and 8 show intermediate positions of the pulley rolls 30 and 35 and of the overturning bars 32 and 38 corresponding to a swivel angle covered in each case of 90° and 180° by the lay-flat apparatus 26 with the pinch rolls 27, starting out from the middle position shown in FIG. 4, in the clockwise and counterclockwise direction.

In conjunction with a lateral edge regulating device (not shown), which monitors and measures the course of the tubular web 1' in the area of the pulley roll 41, in a known manner, the overturning bars 32 and 38 can be adjusted to correct the said course as necessary. For this purpose the data produced by the lateral edge monitoring unit are fed to a regulating unit and processed. By means of the regulating unit a servo can be operated which performs a corresponding adjustment. These regulating and adjusting processes are familiar to the practitioner of the art and therefore require no further explanation or description.

Figure 9:
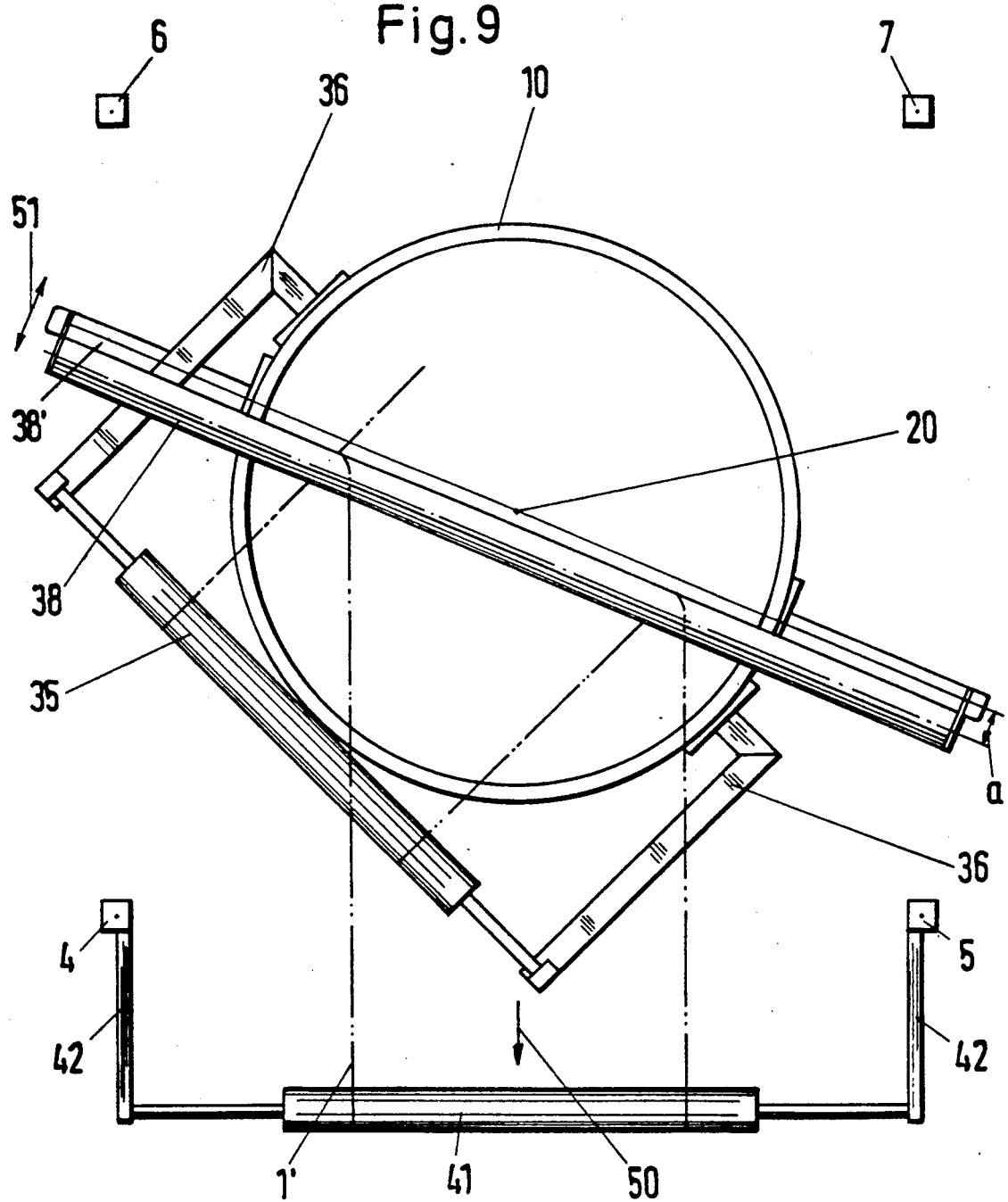

In the case of the present off-drawing apparatus 2, an adjustment of the upper overturning bar 38 will suffice to counteract any lateral movement of the tubular web 1' that may occur for any reason. For this purpose the distance a can be changed, for example, by shifting the overturning bar 38 in the radial direction toward the swivel ring stack 10. This is illustrated in FIG. 9, which is a simplified representation of the off-drawing apparatus in a working position shown in FIG. 7. If the dimension a is reduced, as represented at 38', the tubular web 1', as seen in the running direction 50, runs further leftward, while vice versa, if dimension a increases a rightward shift of the tubular web 1' occurs. To achieve the radial displaceability corresponding to the double arrow 51 in FIG. 9, the overturning bar 38 is supported adjustably on the swivel ring 12 in a manner not further represented.

Figure 10:
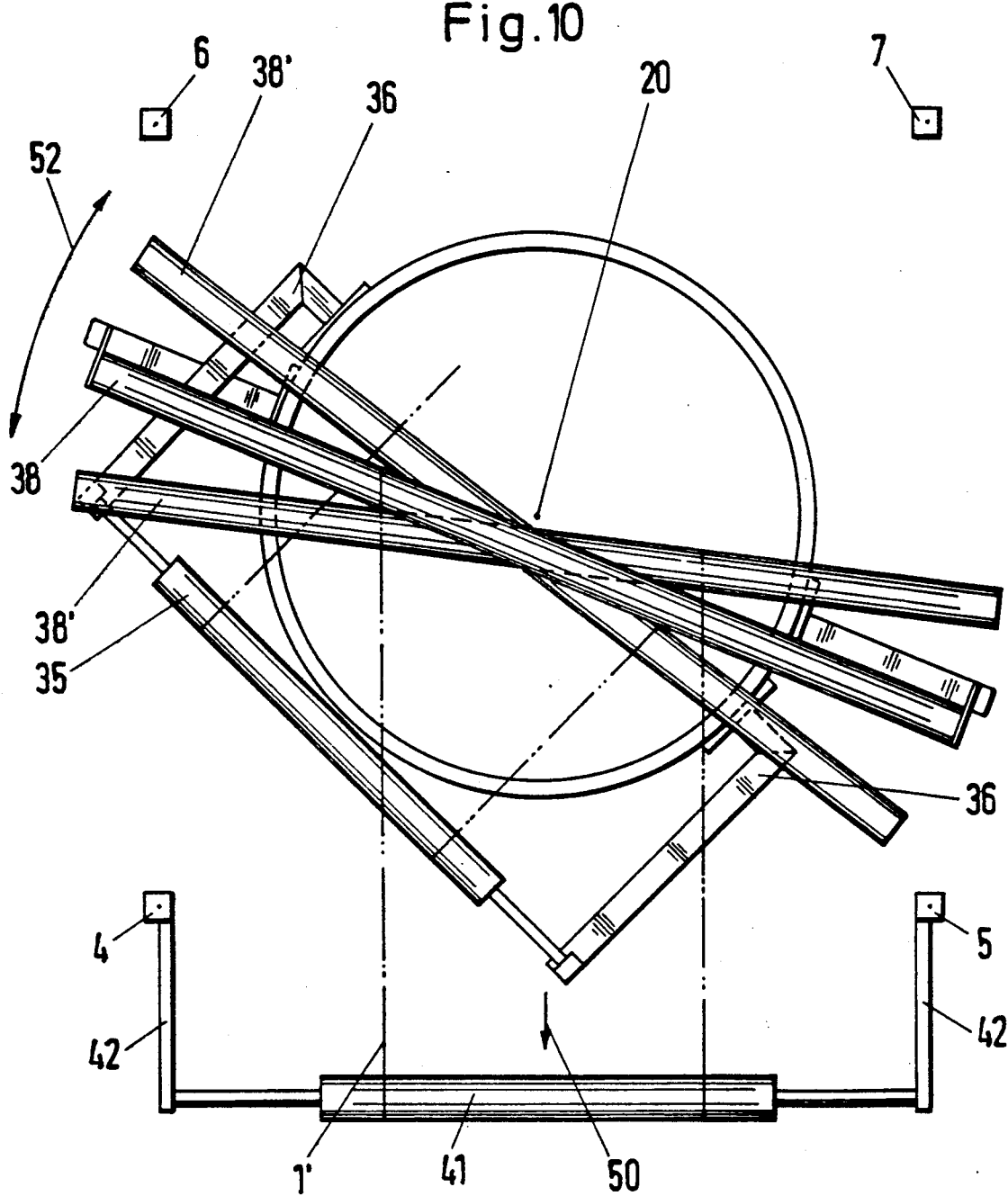

A further possibility for setting the overturning bar 38 to affect the course of the tubular web is shown in FIG. 10, in a representation similar to FIG. 9. In this embodiment the overturning bar 38 is supported for rotation about a vertical axis on the corresponding swivel ring 12, this turning movement of the overturning bar 38 being able to be superimposed in an appropriate manner on the reversing swivel movement of the swivel ring 12. If the overturning bar 38 is, for example, at an angle of 30° at a given moment turning its rotation, it can be turned as indicated by the double arrow 52 by corresponding operating pulses so that at the given moment in its swinging movement it will assume a correspondingly changed angular position, as indicated at 38' in FIG. 10. This will again result in a corresponding lateral shift of the tubular web 1' as a lateral edge regulation.

What I claim is:

1. An off-drawing apparatus for a web of plastic material produced by an extruder having a fixed extruder head, said web having a generally circular cross-sectional configuration as said web is fed from said extruder with said circularly cross-sectioned web having a web axis, comprising a lay-flat means at which said web changes from said circular cross section to a flat web, a pair of pinch roll means between which said flat web passes, a frame means, a ring stack means rotatable on said frame means, said ring stack means comprising a plurality of rings rotatable about said web axis, and a turn-around means mounted on said ring stack means and comprising a turning roll disposed at one location for turning said flat web a first 180-degree turn and a turning bar disposed at another location for turning said flat web another 180-degree turn, said turn-around means further comprising a first mounting means mounted on a first ring of said ring stack means, said turning roll along with said pair of pinch rolls and said lay-flat means being mounted on said first mounting means such that said first mounting means along with said first ring, said pair of pinch rolls and said lay-flat means rotate together as a unit about said web axis, said turn-around means further comprising a second mounting means mounted on a second ring of said ring stack means, said turning bar being mounted on said second ring, said first ring being rotatable relative to said second ring, and a stationary winding means which receives said flat web from said turn-around means and winds said flat web into a roll.

2. An off-drawing apparatus according to claim 1, wherein said turning roll is designated a first turning roll and said turning bar is designated a first turning bar, said turn-around means further comprising a second turning roll for turning said flat web a third 180-degree turn and a third mounting means for mounting said second turning roll on a third ring of said ring stack means, said turn-around means further comprising a second turning bar for turning said flat web a fourth 180-degree turn and a fourth mounting means for mounting said second turning bar on a fourth ring of said ring stack means, said flat web passing sequentially over said first turning roll, said first turning bar, said second turning roll and said second turning bar.

3. An off-drawing apparatus according to claim 2, further comprising drive means for rotatably driving each of said rings of said ring stack means.

4. An off-drawing apparatus according to claim 3, wherein said drive means drives said rings at different circumferential speeds.

5. An off-drawing apparatus according to claim 2, wherein said rings are disposed in a vertical stack with said first ring being the lowermost ring of said vertical stack and said second ring being the uppermost ring of said vertical stack.

6. An off-drawing apparatus according to claim 5, wherein said third ring immediately underlies said uppermost second ring in said vertical stack, said fourth ring being disposed between said first and third rings in said vertical stack.

7. An off-drawing apparatus according to claim 6, wherein third and fourth rings disposed between said first and second rings are rotatably driven by a drive means at a lower circumferential speed than said first and second rings.

8. An off-drawing apparatus according to claim 2, wherein said web axis is a vertical axis, said first and second turning rolls and said first and second turning bars being disposed at an elevation higher than said ring stack means.

9. An off-drawing apparatus according to claim 2, wherein said second to said fourth mounting means each extend radially outwardly of said ring stack means.

10. An off-drawing apparatus according to claim 9, wherein said second to said fourth mounting means each extend at different radial distances from the respective ring on which said second to said fourth mounting means are mounted.

11. An off-drawing apparatus according to claim 10, wherein said second mounting means extends radially outwardly from said second ring a first radial distance, said third mounting means extending radially outwardly from said third ring a second radial distance, said third mounting means extending radially outwardly from said fourth ring a third radial distance, said third radial distance being greater than said second radial distance, said first radial distance being intermediate said second and third radial distance.

12. An off-drawing apparatus according to claim 2, wherein said first mounting means is mounted on the inside of said first ring, said second, third and fourth mounting means being mounted on the outside of said second, third and fourth rings, respectively.

13. An off-drawing apparatus according to claim 2, wherein said rings of said ring stack means are rotatably supported by bearing means disposed between said frame means and said first ring, between said first and fourth rings, between said third and fourth rings, and between said second and third rings.

14. An off-drawing apparatus according to claim 1, further comprising a guide roll mounted on said first mounting means such that said guide roll along with said first mounting means, said turning roll, said lay-flat means, and said first ring rotate together as a unit about said web axis, said flat web passing sequentially to said pinch rolls, said guide roll, said turning roll and said turning bar.

15. An off-drawing apparatus according to claim 14, wherein said guide roll generally overlies said pinch rolls, said guide roll having an upper side generally horizontally aligned with a lower side of said turning roll.

16. An off-drawing apparatus according to claim 15, further comprising drive means for driving each of said rings, said driving means being disposed radially outwardly of said ring stack means.

17. An off-drawing apparatus according to claim 16, wherein said drive means is operable to rotate each of said rings in forward and reverse directions.

18. An off-drawing apparatus according to claim 16, wherein said ring stack means has an axis of rotation, said drive means having a drive shaft having a longitudinal axis parallel to said axis of rotation of said ring stack means.

19. An off-drawing apparatus according to claim 18, wherein said drive means comprises a plurality of drive gears mounted on said drive shaft, each of said rings having driven gears which mesh with said drive gears such that said drive shaft is operable to rotate each of said plurality of rings of said ring stack means.

20. An off-drawing apparatus according to claim 19, wherein said plurality of drive gears are disposed vertically one above another on said drive shaft.

21. An off-drawing apparatus according to claim 19, wherein said driven gears comprise gear teeth on the outer circumference of each of said rings.

22. An off-drawing apparatus according to claim 2, wherein said rings of said ring stack means are rotatably supported by bearing means disposed between said frame means and said first ring, between said first and fourth rings, between said third and fourth rings, and between said second and third rings.

23. An off-drawing apparatus according to claim 22, wherein said bearing means comprise ball bearings.

24. An off-drawing apparatus according to claim 1, wherein said ring stack means has a vertical axis of rotation, said turning bar having a central axis spaced from said vertical axis of rotation a first distance such that said turning bar swivels about said vertical axis of rotation at a radius corresponding to said first distance, said turning bar having a diameter, said first distance being approximately equal to said diameter multiplied by $\pi/4$.

25. An off-drawing apparatus according to claim 2, wherein said ring stack means has a vertical axis of rotation, said second turning bar having a central axis spaced from said vertical axis of rotation a spaced distance such that said second turning bar swivels about said vertical axis of rotation at a radius corresponding to said spaced distance, said fourth mounting means having displaceable means for displaceably mounting said second turning bar such that said spaced distance is changeable.

26. An off-drawing apparatus according to claim 2, wherein said second turning bar is mounted on said fourth mounting means for pivotal movement about a vertical axis.

27. An off-drawing apparatus according to claim 26, wherein said pivotal movement is superimposed on said rotation of said fourth ring.

28. An off-drawing apparatus according to claim 2, further comprising lateral edge regulating apparatus for controlling the positional orientation of said second turning bar.

29. An off-drawing apparatus according to claim 2, further comprising a guide roll mounted on said frame means, said flat web passing from said second turning bar to said guide roll and thence to said stationary winding means.

* * * * *